(12) United States Patent
Felty et al.

(10) Patent No.: US 6,343,372 B1
(45) Date of Patent: Jan. 29, 2002

(54) METHODS AND APPARATUS FOR GENERATING A VERIFIED ALGORITHM FOR TRANSFORMING A PROGRAM FROM A FIRST FORM TO A SECOND FORM

(75) Inventors: Amy Patricia Felty; Douglas J. Howe, both of Berkeley Heights, NJ (US); Abhik Roychoudhury, Stony Brook, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/330,526

(22) Filed: Jun. 11, 1999

(51) Int. Cl.[7] .................................................. G06F 9/44
(52) U.S. Cl. .................... 717/2; 717/4; 717/7; 703/2
(58) Field of Search ............................... 717/1, 2, 4, 7, 717/8; 706/59, 45, 922; 703/2

(56) References Cited

U.S. PATENT DOCUMENTS

| | | | |
|---|---|---|---|
| 5,963,739 A | * 10/1999 | Homeier | 717/4 |
| 5,987,252 A | * 11/1999 | Leino et al. | 717/4 |
| 6,128,774 A | * 10/2000 | Necula et al. | 717/5 |
| 6,157,901 A | * 12/2000 | Howe | 703/2 |

OTHER PUBLICATIONS

Aagaard & Leeser, "PBS: Proven Boolean Simplification," IEEE Transactions on Computer–Aided Design of Integrated Circuits and Systems, vol. 13, No. 4, Apr. 1994, pp. 459–470.*

Richard J. Boulton, "A Tool to Support Formal Reasoning about Computer Languages," 1996. Retrieved from ResearchIndex, http://citeseer.nj.nec.com/318714.html [Aug. 10, 2001], pp. 1–21.*

Allen et al., "The Semantics of Reflected Proof," IEEE 1990, pp. 95–105.*

Peter A. Lindsay, "A survey of mechanical support for normal reasoning," Software Engineering Journal Jan. 1988, pp. 3–27.*

A.P. Felty et al., "Protocol Verification in Nuprl," Tenth International Conference on Computer Aided Verification, Springer–Verlag Lecture Notes in Computer Science, pp. 429–439, Jun. 1998.

R. Boulton et al., "Experience with Embedding Hardware Description Languages in HOL," International Conference on Theorem Provers in Circuit Design, pp. 129–156, 1992.

E.M. Clarke et al., "Model Checking and Abstraction," Proc. 19th Ann. ACM Symp. on Principles of Prog. Lang., pp. 343–354, Jan. 1992.

P. Wolper, "Expressing Interesting Properties of Programs in Propositional Temporal Logic," Proc. 13th Ann. ACM Symp. on Principles of Prog. Lang., pp. 184–191, Jan. 1986.

Robert L. Constable, "A Note on Complexity Measures for Inductive Classes in Constructive Type Theory," Information and Computation 143(2), pp. 137–153, 1998.

* cited by examiner

Primary Examiner—Tuan Q. Dam
(74) Attorney, Agent, or Firm—Ryan, Mason & Lewis, LLP (57) ABSTRACT

A method of synthesizing an algorithm for transforming a program from a first form to a second form includes first formalizing a language associated with the program to be transformed in accordance with a theorem proving system. Then, a proof is built in accordance with the theorem proving system based on a theorem asserting a representability associated with the program, the representability being expressed as inductive predicates over semantic domains. The method then extracts the algorithm based on the proof. The algorithm is capable of transforming the program from the first form to the second form. In one embodiment, the algorithm is a correctness verified abstraction algorithm and the theorem proving system is Nuprl.

17 Claims, 3 Drawing Sheets

METHODS AND APPARATUS FOR GENERATING A VERIFIED ALGORITHM FOR TRANSFORMING A PROGRAM FROM A FIRST FORM TO A SECOND FORM

FIELD OF THE INVENTION

The invention relates to the generation of a verified algorithm, e.g., an abstraction algorithm, capable of transforming a program, e.g., a protocol and associated correctness properties, from a first form, e.g., concrete or original, to a second form, e.g., abstracted, and more particularly to the generation of such algorithm via an implicit syntax approach to a formal metatheory of programming languages.

BACKGROUND OF THE INVENTION

As is well known, a system model is a computer program, block of code, or set of program operations that, upon execution, simulates intended properties, i.e., functions and/or features, of a subject system. That is, a system model may represent a system's protocol and/or specification and its correctness properties, as will be explained. The system model is typically designed to accept inputs, perform functions and generate outputs in the same manner as would the actual system. By way of example, it may be useful to create a system model that simulates a communications protocol in order to test the protocol prior to use in a communication system. However, once a system model is created, the model must be verified to determine whether the model accurately simulates the intended properties of the system. This can be accomplished by inputting the model to a model checker. The model checker is a computer program, block of code, or set of program operations that verifies that the performance of the model matches the desired system behavior envisioned by the system designer.

In formal verification, the system model is converted into a finite state machine. As is well known, a finite state machine is a set of states and state transitions which mimic the operation of the system model in response to any given set of system model inputs. More particularly, each state represents a state or operational mode that the system model would enter given a set of inputs, and each transition state indicates the condition, i.e., the value of system model inputs and system model variables, that must be satisfied for the system model to successfully transition from one state to another state.

Once a system model is converted to a state machine, a model checker can test whether the system model operates in accordance with the desired set of expected behaviors, i.e., system properties. In operation, the checker varies the system model inputs and monitors which states the system model enters as a result of the inputs. As will be appreciated by those skilled in the art, this operation is known as searching the state space of the system model. While searching the system model state space, the model checker checks whether the system model enters a state or a cycle of states which the system designers have defined as so-called "bad" or unintended operations. Thus, the model checker can identify for the system designers particular problematic system design features that require redesign in order to comply with intended system performance.

However, it is also known that more complicated systems require more complicated system models. This means that the state machine used to represent the system model includes more states and more state transitions, thus, a larger state space. Unfortunately, when the state space becomes larger, it becomes more difficult to determine whether the model is correct. In order to reduce the difficulty in verifying the correctness of such large models, model creators have proposed generating an abstracted version of the model, i.e., a model that represents the actual system but that includes a reduced set of states and transitions. The abstracted system model then serves as input to the model checker. The model checker then has less difficulty in verifying the reduced state program. This abstraction approach requires the creation of an abstraction algorithm (i.e., computer program, block of code, or set of program operations) capable of transforming the original system model into an abstracted system model. However, it must be proven or verified that the abstraction algorithm applies to the model sought to be abstracted. That is, it is critical that the abstraction algorithm be verified for correctness with respect to the protocol or specification to be input thereto.

It is known that theorem proving and model checking can be combined in a useful manner by employing a theorem proving system to verify abstractions of protocols or system specifications, i.e., system models. In particular, as mentioned above, one can often use a model checker to verify some property of a protocol that has an infinite or intractably large state space, by first transforming the original or concrete protocol into a more abstracted version for which model checking is feasible. For example, this is described in: P. Wolper, "Expressing Interesting Properties of Programs in Propositional Temporal Logic," In Proc. $13^{th}$ Ann. ACM Symp. On Principles of Prog. Lang., January 1986; and E. M. Clarke, O. Grumberg, and D. E. Long, "Model Checking and Abstraction," In Proc. $19^{th}$ Ann. ACM Symp. on Principles of Prog. Lang., January 1992. A theorem prover can be used to check, for example, that the property (or some transformation of it) holds of the abstract protocol if and only if it holds of the original protocol. This can be done directly by formalizing the two versions of the protocol and proving the specific property of interest. This approach is taken in K. Havelund and N. Shankar, "Experiments in Theorem Proving and Model Checking for Protocol Verification," In Proc. of Formal Methods in Europe (FME), 1996, which discloses using the integration of a BDD (boolean decision diagram) based model checker as a decision procedure in the theorem prover PVS (Prototype Verification System). PVS is disclosed in S. Rajan, N. Shankar, and M. K. Srivas, "An Integration of Model Checking with Automated Proof Checking," In Proc. of the Seventh International Conference on Computer Aided Verification (CAV '95), Vol. 939 of Lecture Notes in Computer Science, pages 84–97, Springer-Verlag, 1995.

One can also provide general support for doing this kind of reasoning by formalizing a refinement calculus and methodology relating system specifications and abstractions, as in O. Muller, "A Verification Environment for I/O Automata Based on Formalized Metatheory," PhD thesis, Technische Universitat Munchen, 1998. One can also use a model checker with assumption commitment style reasoning on the abstract system and then use a theorem prover to discharge the assumptions in the concrete system, as in J. Dingel and T. Filkorn, "Model Checking for Infinite State Systems Using Data Abstraction, Assumption-Commitment Style Reasoning and Theorem Proving," In Proc. of the Seventh International Conference on Computer Aided Verification (CAV '95), Vol. 939 of Lecture Notes in Computer Science, pages 54–69, 1995.

Typically, when a system specification is represented in a theorem prover, a so-called "shallow embedding" is used. In a shallow embedding of a programming or specification language in a theorem prover, programs and specifications are directly interpreted in the logic of the theorem prover. Thus, one formalizes only the semantics of the language. For example, the commands of an imperative programming language might be encoded as objects of type com=state→state, with language constructs for forming commands being operators over this type, for example c1; c2=λs:state.c2(c1(s)). Thus, in a shallow embedding, the commands of the imperative language are defined as particular functions of type com, but the type com will also contain objects that are not the meaning of any command expressible in the given programming language.

In comparison to shallow embedding, "deep embedding" of a programming or specification language includes representing both the semantics and syntax of the embedded formalism in the theorem prover. Using this approach, one might have a type comsyn consisting of abstract syntax trees of commands, and then a meaning function M∈comsyn→com. Theorems quantify over syntax trees, and all reasoning about semantics is mediated by M. Deep embeddings are considerably more difficult to reason about in theorem provers. In practice, shallow embeddings are used whenever possible, and deep embeddings are done only when one is interested in some property that cannot be expressed by referring to semantic objects alone. A comparison of these two methods is presented in R. Boulton, A. Gordon, M. Gordon, J. Harrison, J. Herbert, and J. Van Tassel, "Experience with Embedding Hardware Description Languages in HOL," in International Conference on Theorem Provers in Circuit Design, pages 129–156, North-Holland, 1992. However, many programs or specifications contain properties that cannot be expressed by referring to semantic objects alone and, thus, conventional theorem proving requires the use of deep embeddings.

The concept of representing syntax implicitly in type theory via an inductive predicate is disclosed in R. L. Constable, "A Note on Complexity Measures for Inductive Classes in Constructive Type Theory," Information and Computation, 143(2): 137–153, 1998, where it is proposed as a way of defining internal computational complexity measures. However, no implementations are disclosed and no proofs are given. While the Constable article discusses how to make implicit codes for the syntactic structure of programs explicit, it proposes only using them to reason formally within type theory about the computational complexity of programs. Furthermore, the Constable article does not address the use of implicit syntax together with extraction to synthesize metaprograms.

There is an approach involving program extraction and model checking described in C. Sprenger, "A Verified Model Checker for the Modal μ-Calculus in Coq," Proceedings of TACAS98, pages 167–182, 1998, in which the correctness proof of a model checker in the Coq proof checker yields, via extraction, an executable model checker which is then considered as a trusted decision procedure. However, such approach does not employ implicit syntax but rather represents the syntax of the μ-calculus using a conventional explicit approach.

Therefore, a need exists for techniques that allow for improved generation of a correctness verified algorithm (e.g., an abstraction algorithm), in conjunction with a theorem proving system, capable of transforming a program (e.g., system model, system protocol, system specification, and its correctness properties) from a first form (e.g., original or concrete) to a second form (e.g., abstracted) that, among other things, is not dependent on deep embeddings and employs unique implicit syntax and program extraction techniques in generating the correctness verified algorithm.

SUMMARY OF THE INVENTION

The present invention provides for such improved correctness verification algorithm generation techniques. Such algorithm generation techniques involve an implicit syntax approach to a formal metatheory of programming languages. The techniques of the invention rely on semantic reasoning, which advantageously avoids the complications that arise when formally reasoning about syntax. The semantic reasoning of the invention contains an implicit construction of the result, i.e., the verified algorithm, using inductive predicates over semantic domains that express representability, as will be explained, in a particular protocol language. Advantageously, such implicit construction allows the synthesis of a verified algorithm that transforms an original program into an abstracted version thereof via recursion on syntax.

In a broad aspect of the invention, a method of synthesizing an algorithm for transforming a program from a first form to a second form includes formalizing a language associated with the program to be transformed in accordance with a theorem proving system. Then, the synthesis method includes building a proof in accordance with the theorem proving system based on a theorem asserting a representability associated with the program, the representability being expressed as inductive predicates over semantic domains. Lastly, the algorithm is extracted based on the proof such that the algorithm is capable of transforming the program from the first form to the second form.

In an illustrative embodiment of the invention, we show how to exploit the constructivity of the well-known Nuprl theorem prover, as described in R. L. Constable et al., "Implementing Mathematics with the Nuprl Proof Development System," Prentice-Hall, Englewood Cliffs, N.J., 1986, to synthesize (i.e., generate or create) a particular verified-correct abstraction algorithm. We build a proof in Nuprl from which we can extract a program that then takes a concrete specification (e.g., protocol) as input, tests whether the abstraction method applies to it, and if so, returns the abstracted system specification.

Advantageously, the techniques of the present invention perform such algorithm synthesis without the use a deep embedding. As mentioned, our proof reasons only about semantics, yet we are able to synthesize a program that operates on syntax. That is, we reason only about the semantic aspects of the abstraction method, even though we implicitly are constructing the program that builds abstracted programs.

This implicit construction is based on inductive predicates over semantic domains that express representability in a particular protocol language. As used herein, the term "inductive predicate" is a predicate that is defined as the least predicate satisfying some specified closure conditions. The definition of the term "representability" as used herein depends on the protocol language being formalized. A Nuprl definition of representability is given below in section III of the detailed description. For example, we might say that a command c∈com is representable if "there exist $c_1$, $c_2$∈com such that c=$c_1$; $c_2$" where we will have a disjunct for each kind of command in the language. Viewed constructively, representability takes the place of a type of abstract syntax tree. However, we cannot directly write down a function which takes a command and returns a list of all the program variables occurring in it, since a command is just a function on states that is assumed to be representable, and we cannot in general determine the list of variables from this function. Thus, it is to be understood that representability is a predicate on semantic objects.

By way of further example, representability may be defined for a simplified programming language consisting of only three kinds of commands. A command c (i.e., a member c of com) is representable if: (i) c=skip; or (ii) c:=e (for some variable x and representable expression e); or (iii) c=$c_1$; $c_2$ (where $c_1$ and $c_2$ are representable commands). This exemplary definition also refers to representablity of expressions, which can be analogously defined. This definition has the form of a standard inductive definition.

We illustrate the techniques of the present invention by applying them to a simple but common data abstraction method. The correctness of the abstraction, as well as the representability of the abstract system specification, is proven in Nuprl. We used the program extracted from these proofs to obtain the abstraction of a simple communication protocol.

DETAILED DESCRIPTION OF PREFERRED EMBODIMENTS

The present invention is described below in the context of the generation of a verified correct abstraction algorithm via Nuprl. However, it is to be appreciated that the invention is not limited to the generation of such a specific type of algorithm, nor is it limited to the use of the Nurpl verification environment. Rather, the invention is more broadly applicable to the synthesis of verified algorithms, via semantic reasoning and implicit syntax, for the manipulation of other programs where correctness is important. Also, it is to be appreciated that the term "algorithm" is intended to be synonymous with the phrases "computer program", "block of code", or "set of program operations." However, to clarify the description of the invention, the abstraction program is referred to as an algorithm, while the entities input thereto and output therefrom are referred to as programs (e.g., models, protocols, specifications, and/or properties). Nonetheless, where it is clear which entity is being referred to, the terms may be interchanged.

For ease of reference, the remainder of detailed description will be divided into sections as follows: (I) Protocol Verification in Nuprl; (II) Overview of Data Abstraction; (III) Defining Representability in Nuprl; (IV) Results of the Nuprl Formalization; and (V) Details on the Nuprl Proofs.

I. Protocol Verification in Nuprl

Figure 1:
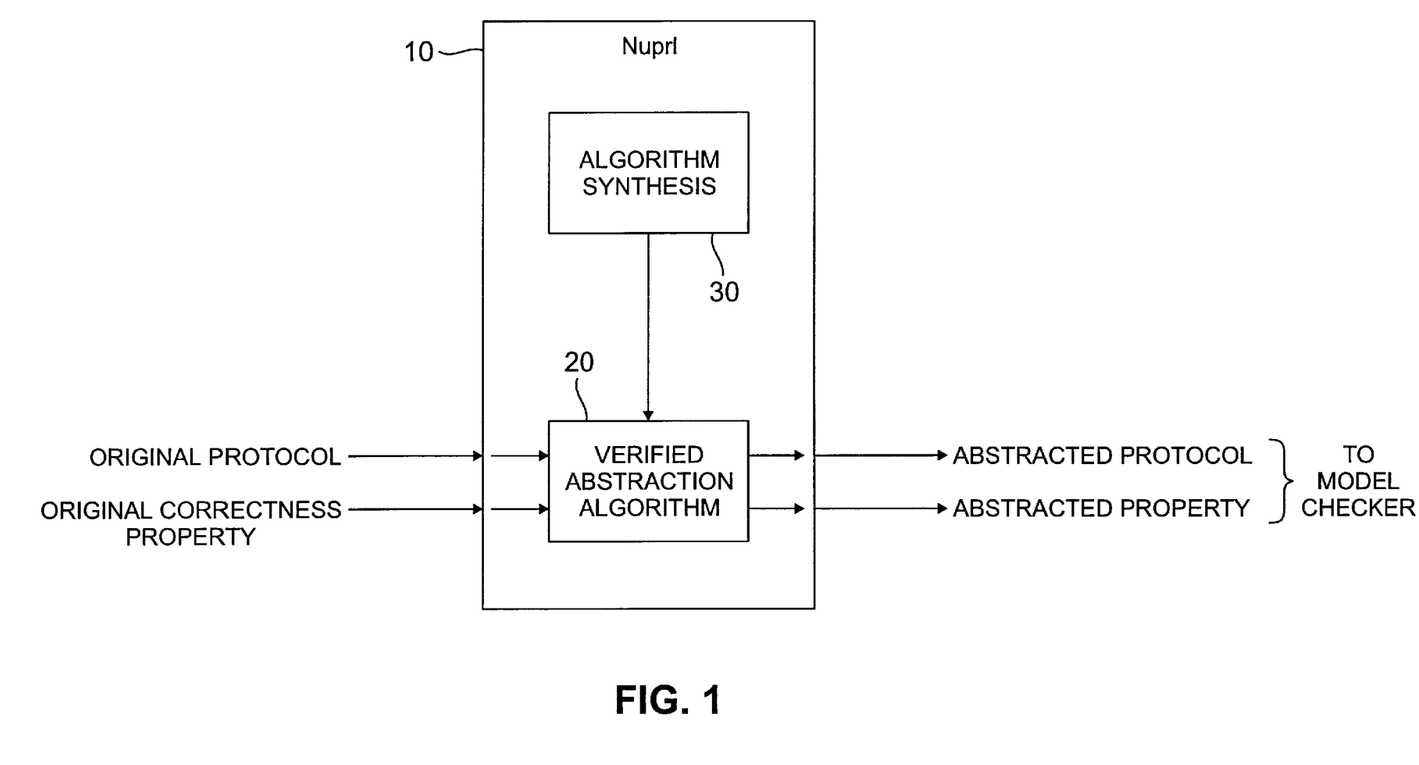
FIG. 1 is a diagram illustrating abstraction algorithm synthesis in a Nuprl environment in accordance with the present invention.

Referring initially to FIG. 1, a diagram illustrating abstraction algorithm synthesis in a Nuprl environment in accordance with an embodiment of the present invention is shown. Particularly, a theorem proving system 10 such as, for example, the Nuprl verification environment, is employed to synthesize a verified abstraction algorithm 20. The algorithm is formed, as will be explained in detail below, via an algorithm synthesis process 30 which: (i) formalizes the semantics of the protocol language; (ii) defines representability as a predicate on the semantic domain; (iii) states a theorem asserting the representability of an abstracted version of the protocol; (iv) builds an existence proof for the abstracted protocol; and (v) extracts the abstraction algorithm in accordance with the proof. Once generated, the verified algorithm 20 may receive, for example, an original or concrete model, e.g., a protocol and correctness property. The algorithm then operates on the input and generates an abstracted version of the input, e.g., abstracted protocol and property. The abstracted protocol and property may then be provided to a model checker so that the protocol can be verified as to how well it simulates the underlying subject system. Given this overall diagram, the remainder of this section and the following sections provide a detailed description of the steps associated with the inventive synthesis process 30 for generating the verified abstraction algorithm 20, according to an illustrative embodiment.

In this embodiment of the invention, we preferably use the environment for protocol verification that was built in the course of verifying the SCI cache coherence protocol, A. P. Felty, D. J. Howe, and F. A. Stomp, "Protocol Verification in Nuprl," in Tenth International Conference on Computer Aided Verification, pages 428–439, Springer-Verlag Lecture Notes in Computer Science, June 1998, the disclosure of which is incorporated herein by reference. Here, shallow embedding of a Unity-like guarded command language in which protocols are expressed is briefly discussed. This language is illustrated with a running communication protocol example presented below:

Program P:
Initial Condition: sent=−1
Actions: $[r_1, r_2, s_0, \ldots s_{n-1}, q_m]$ for some n>0, m$\geq$0
($r_1$) true→s!request
($r_2$) buf[r]?rsend(rdata)→rcvd:=rdata
($s_d$) buf[s]?request→sent:=d;q!qsend(sent, 0)
($q_m$) buf[q]?qsend(data, i)→if I=m then r!rsend(data) else q!qsend(data, i+1) fi
Property $\Psi$:
Data delivery: $\forall$y. G(sent=y→F(rcvd=y))
Order preservation: $\forall y_1$. $\forall y_2$. G((sent=$y_1 \wedge$ F(sent=$y_2$))→F(rcvd=$y_1 \wedge$F(rcvd=$Y_2$)))

In this language, a specification or program is a list of guarded "actions," each having a "guard" and a "body," along with an initial condition on values of program variables. In general, guards can be message receives or boolean conditions, and bodies can contain assignments, conditionals, and message sends. The example presents a protocol with three distinct processes—Sender, Channel (or Queue), and Receiver, denoted s, q, and r, respectively. Consider the two actions for the Receiver, marked $r_1$ and $r_2$. In $r_1$, the guard always holds and the body contains a message to the sender requesting data, where request is the message type. A message can also contain arguments as illustrated in $r_2$. Here, the guard indicates that this action can be executed if the first message in buf[r] (r's message buffer) has type rsend. This message has one argument, rdata, containing the requested data. The message is removed from the queue (received) and the body is executed. The Sender and Channel processes both have a single parameterized action ($s_d$ and $q_m$, respectively). Action $s_d$ is parameterized by the value of the data transmitted to the Channel. Action $q_m$ is parameterized by the length of the channel. Thus, the above specification represents a collection of programs where the number of data values and the length of the queue are bounded by an arbitrary finite number.

Nuprl is a goal-directed interactive theorem prover in the style of LCF (Logic for Computable Functions). Nuprl implements a constructive type theory with a rich set of constructors. Because of the constructivity, programs can be extracted from proofs. Logic is encoded via the propositions-as-types principle, whereby a proposition is identified with the type of data that provides evidence for the proposition's truth. The version of Nuprl preferably used in accordance with the invention is further described in D. J. Howe, "Semantics Foundations for Embedding HOL in Nuprl," in Algebraic Methodology and Software Technology, pages 85–101, Springer-Verlag Lecture Notes in Computer Science, 1996, the disclosure of which is incorporated herein by reference. This version also supports classical reasoning, which can be used in any part of a proof that does not affect the extracted program. Formal mathematics in Nuprl is organized in a single library, which is broken into files simulating a theory structure. Library objects can be definitions, display forms, theorems, comments or objects containing the well-known metalanguage (ML) code. Definitions define new operators in terms of existing Nuprl terms and previously defined operators. Display forms provide notations for defined and primitive operators. Theorems have tree structured proofs, possibly incomplete. Each node has a sequent, and represents an inference step. The step is justified either by a primitive rule, or by a "tactic." Tactics provide automation to help with a goal-directed search.

Our embedding of the semantics of state transition system in Nuprl is as follows. We define a state as a pair where the first component is the usual mapping from identifiers to values. The second component is a "history" variable that records the sequence of messages that have been sent and received during the entire execution. This history variable is important for reasoning about data that passes via messages. The Nuprl definitions of the components of state are given below. Booleans (B), atoms, integers (Z), and lists are defined in the standard Nuprl libraries.

$$
\begin{aligned}
&\text{PId} &&== \{k:Z\,|\,k\geq 0\} &&\text{hist\_el} &&== B\times \text{PId}\times Z\times \text{mesg}\\
&\text{id} &&== \text{Atom}\times \text{PId} &&\text{hist} &&== \text{hist\_el List}\\
&\text{mesg} &&== Z\times Z\text{List} &&\text{state} &&== (\text{id}\to Z)\times \text{hist}
\end{aligned}
$$

For simplicity, the values of all identifiers (id) are assumed to be integers. The first component of an identifier is its name (type Atom) and the second is the process identifier (type PId) to which the variable belongs. The second component is not necessary in our example program, so we just choose a constant. The first component of a history element (hist_el) is a boolean value indicating whether the message is a send (tt) or a receive (ff). The remaining components are the sender, receiver, and message. Message types such as rsend are encoded as integers as the first component of a message. The second component encodes the arguments.

Expressions and commands are defined as functions on state. As an example, we give the definition of the assignment command:

$$
\begin{aligned}
&\text{exp} &&== \text{state}\to Z &&\text{com} &&== \text{state}\to \text{state}\\
&x:=e &&== \lambda s.\langle \lambda y.\text{if}\;\;(x=y)\;\;\text{then}\,(e\cdot s)\;\;\text{else}\,(y\cdot s),\,s.h\rangle
\end{aligned}
$$

Nuprl's display forms are used to define: = and • as infix operators. The dot is used for evaluation in a state and is overloaded. Here e•s is expression evaluation defined as (e s) and (y•s) maps identifiers to values and is defined as (s.1 y) where .1 denotes the projection of the first element of a pair.

Other commands are defined similarly. Note that the assignment statement updates the first component of the state. The send command updates the second component by simply adding a history element to the end of the history. The source of the send is implicit in the commands of our example program; we write p→d!T (args) when we wish to make it explicit. The receive command also adds a history element to the front of the history, but it is more complicated because it computes this element from the contents of the current history h. In particular, it finds the first message which has been sent to and not yet received by a particular process. In addition to affecting the history, the command also performs assignments of the identifiers to the values obtained in the computed history element.

A program, such as in the running example above, is defined as a pair containing a list of commands and an initial condition which is a predicate on state (of type state→$P_1$ where $P_1$ is the type of Nuprl propositions). The initial condition must at least require that the history start out empty. In our model, a command is enabled if it changes the state when applied. Thus, commands whose guards are true but do not change the state are considered disabled. A trace is defined in the usual way as a function of type N→state. A predicate trace_of encodes the restriction that for any n, there is an action such that when applied to state n results in state n+1. Temporal operators such as G (always) and F (eventually) are defined as predicates on traces (of type trace→$P_1$) using a fairly direct encoding of the definitions in Z. Manna and A. Pnueli, "The Temporal Logic of Reactive and Concurrent Systems," Springer Verlag, 1991. We then define the notion of a property psi ($\Psi$) being valid of a program P in the usual way.

In A. P. Felty, D. J. Howe, and F. A. Stomp, "Protocol Verification in Nuprl," in Tenth International Conference on Computer Aided Verification," pages 428–439, Springer-Verlag Lecture Notes in Computer Science, June 1998, the disclosure of which is incorporated herein by reference, the automation that we developed for the verification of protocols in Nuprl is discussed in detail. With regard to the present invention, we draw on the machinery for rewriting, which draws on a large body of equality theorems for protocols. We will see some examples in (V) Details of the Nuprl Proofs.

II. Overview of Data Abstraction

In this section, we discuss a few basics of the form of data abstraction used in this embodiment of the invention. Suppose we are given a program P and a property $\Psi$ of traces of the program, and we want to verify whether $P\models\Psi$, i.e., whether all traces of P satisfy $\Psi$. Suppose P contains a variable v that can take on an arbitrarily large number of data-values. We may be able to perform "data-value abstraction" on v to create an abstract program P' and an abstract property $\Psi'$ such that $P'\models\Psi'\Leftrightarrow P\models\Psi$ and such that v takes on values from a smaller set during execution of P'.

We first discuss how to compute an abstract program from a concrete program, and then discuss some sufficient conditions, that can be checked statically, under which this abstraction is safe.

(a) Computing the Abstract Program

In our running example program above, the data that we are particularly interested in and whose values we want to abstract is the value that gets assigned to the identifier sent. The flow of this value through the program execution is important for proving both the data delivery and the order preservation property. We formalize this flow as a set of identifiers that are affected by the value of sent. We must also consider communication via message buffers. To take this into account, we define a "message reference" to be a pair <T, i> where T is a message type, and i is a natural number denoting a position in the list of arguments to a message. A "data reference" of a program is either a program variable or a message reference. For example, the value of sent gets passed via the message reference <qsend, 0>.

From now on, we will use d to denote the set of all data references possibly affected by the values of the variable(s) being abstracted. In our example, we have:

d={sent, <qsend, 0>, data, <rsend, 0>, rdata, rcvd}.

It is to be appreciated that it is possible to compute a suitable d.

We consider the following restrictions on the property $\Psi$: (i) $\Psi$ is a universally quantified linear temporal logic formula; (ii) all occurrences of a universally quantified variable y in atomic propositions in $\Psi$ are equalities of the form v=y or n=y where v is a program variable and n is an integer value.

First, we decide on "abstraction function" defined as $\phi$, also called a "collapsing function" which will map the data-values of v to a small finite domain. It is possible to derive $\phi$ from $\Psi$ as follows. Consider all the universally quantified variables $y_1, \ldots, y_n$ in property $\Psi$, which are in equality relation with some variable u$\in$d. The data-values of v are mapped into the domain $\{-1, m_1, \ldots, m_n\}$, where $m_1, \ldots, m_n$ are distinct integers other than $-1$ such that $v_{abs}=m_i$ whenever $v=m_i 1 \leq i \leq n$, and $v_{abs}=-1$ whenever $\wedge_{1 \leq i \leq n} (v \neq m_i)$, where $v_{abs}=m_i$ denotes variable v having value m in the abstract program P'.

In our running example, in order to verify the data delivery property, we will therefore abstract the data values of sent to a two-valued abstract domain. For instance, we can use the functions $\phi_y$, parameterized by the y of our data delivery property, defined by $\phi_y(n):=$(if n=y then y else $-1$). Using this function corresponds to tracking the delivery of the data-value y. The value $-1$ represents all other concrete values. Similarly, to verify the order-preservation property, we need to abstract the values of sent to an abstract domain with three distinct values. One of ordinary skill in the art will appreciate that the abstraction function can be obtained in a similar fashion for a larger class of properties than those whose atomic propositions are restricted to equality.

The abstraction function $\phi_y$ is parameterized by y, so it would initially appear that we would need to generate a new abstract program for every y of interest. However, note that in our running example, the only processes to assign to sent are the processes $s_d$, and that the possible assigned values are $\{0 \ldots n-1\}$. The protocol is symmetric on these values: if we apply a permutation of these values to the right-hand-sides of all assignments of constants to sent, then we get the same protocol. Because of this symmetry, checking the data-delivery property for an arbitrary y in $\{0, \ldots, n-1\}$ is the same as checking it for y=0.

We assume that we are interested in checking $\Psi(y_1, \ldots, y_n)$ only for particular values of the $y_i$, in particular for sets $D_i$ of integers. In our example, the set $D_1$ is $\{0, \ldots, n-1\}$. From now on, for simplicity and to be consistent with our Nuprl proof, we assume that n=1, and so the property to be checked has the form $\forall_{y \in D}. \Psi(y)$.

We can compute the abstract program P' as follows. First compute d, and then, for all u$\in$d, replace any constraint u=n in the initial condition of P, where n is a constant, by u=$\phi$(n), and replace any assignment u:=expr (and any check u=expr) in any action of P by u:=$\phi$(expr)(u=$\phi$(expr)). If we know that data values are only passed around and not manipulated in d then we are guaranteed that our data-value abstraction preserves enough information to verify property $\phi$.

(b) Main Proof Obligations for Correctness of the Abstraction

Before describing the proof obligations for the soundness of data-value abstraction, we extend $\phi$(the abstraction function) to states and traces. In particular, we define a function on states, denoted $\gamma_d^\Phi$, where $\phi$ is the function to be extended and d is a set of data references. The collapsed state $\gamma_d^{100}$ (s) is obtained from state s by mapping the value of each program variable x in d to $\phi$(x.s) and applying $\phi$ to each value t such that there is a message reference <T, i> in d and t is the $i^{th}$ argument to a message of type T in the history component of s. We will often just write $\gamma$ when $\phi$ and d are obvious from context. Traces being infinite sequences of states, we define $\gamma_d^\Phi(tr).i=\gamma_d^\Phi(tr.i)$ where tr.i denotes the $i^{th}$ state in the trace tr, for any natural number i. Note that we overload $\gamma_d^\Phi$.

Let trace(P) denote the set of all valid traces of program P. The proof obligations are:

(1) $\forall tr.(tr \in trace(P)) \leftrightarrow (\gamma(tr) \in trace(P'))$ (2) $\forall tr.\gamma(tr) \models \Psi(m) \leftrightarrow tr \models \Psi(m)$ where $\Psi(y)$ is a quantifier free LTL (Linear Temporal Logic) formula with free variable y and m is the instance chosen for y.

(3) For all permutations of D, $\forall tr.(tr \in trace(P)) \leftrightarrow (\gamma_d^f(tr) \in trace(P'))$ (4) For all permutations $f$ of D, and for all m$\in$D, $\forall tr.tr \models \Psi(m) \neg \gamma_d^f(tr) \models \Psi(f(m))$ If the above conditions hold true then:

P'$\models \Psi(m) \leftrightarrow$ P$\models \forall y \in D.\Psi(y)$.

A generic sufficient condition for proof obligation (1) is that the control flow of program P is completely independent of the values of the data references in d. For example, there can be no conditional branching on the value of variables in d. Additionally, the initial condition of the program and the guards of the program actions must be independent of the values of the data references in d. As we will show in Section (V): Some Details of the Nuprl Proofs, this property can be defined formally as a static check on programs.

A sufficient condition for proof obligation (3) is similar to the one for proof obligation (1), except that we additionally require that in any action a containing an assignment x:=n, where n$\in$D and x is in d, all assignments in a of constants to members of d have n as the right-hand side and, furthermore, for every other m$\in$D, there is another action a' such that a' is the result of replacing in a each assignment of the form z:=n by z:=m.

Note that because of our implicit approach to syntax, we cannot formalize such notions as "every assignment in a of the form . . . " Nevertheless, we can prove a theorem whose extracted program performs a check for this sufficient condition. Its is to be appreciated that proof obligations (2) and (4) may also be proven by hand on a case-by-case basis.

III. Defining Representability in Nuprl

In this section, we define representability of commands according to the invention which, as mentioned, allows us to reason semantically about data abstraction, while implicitly constructing a program that operates on syntax. In the interests of compactness, in this section, as well as later sections, we adopt a more mathematical style of presentation instead of giving exactly what would appear in the theorem prover. We give a few such exact examples to illustrate that the differences in presentation are minor notational ones.

To talk about the representability of commands, we also need to define the representability of expressions. In both cases, we parameterize by a state invariant, since ultimately we will only want a program and its representation to be equivalent on certain states. In our case, we only need to consider states collapsed by $\gamma$. We define equality up to invariant I as follows:

$e_1 =_I e_2 := \forall s:state.I\ (s) \Rightarrow e_1.s = e_2.s$ $c_1 =_I c_2 := \forall s:state.I\ (s) \Rightarrow c_1.s = c_2.s$ These two definitions are the same except that in the first case the equality is between integers, while the second equality is between states.

Representability of expressions, denoted $R_I(e)$ or $R[I](e)$, is inductively defined below. We omit the types of bound variables when they are clear from context. $R_I(e)$ is true if and only if (iff):

$e =_I \text{false} \lor e =_I \text{true} \lor [\exists n:Z. e =_I n] \lor [\exists x:id. e =_I x] \lor [\exists b, e_1, e_2. (R_I(b) \land R_I(e_1) \land R_I(e_2)) \land e =_I$ (if $b$ then $e_1$ else $e_2$)] $\lor [\exists e_1, e_2.R_I(e_1) \land R_I(e_2) \land (e =_I(e_1+e_2) \lor e =_I (e_1-e_2)$ $\lor e =_I (e_1 = e_2) \lor e =_I (e_1 \lor e =_I (e_1 \land e_2))] \lor [\exists e'.R_I(e') \land e =_I \neg e']$ We use several abbreviations here. For example, n in the equality denotes $\lambda s.n$ and x in the equality $e =_I x$ denotes $\lambda s.(x.s)$. Also, $e_1 \land e_2$ denotes $\lambda s.\text{if } [(e_1.s=\text{true})\ (e_1.s=\text{true})]$ then true else false, and similarly for the other operators. Note that we overload the operators in binary expressions. For example, $\land$ also denotes the conjunction of Nuprl.

Representability of commands is parameterized by an invariant, as above, and also by a predicate on commands. Intuitively, $R_{I,Q}$ (c) (also denoted $R[I,Q](c)$) means that c is representable, up to I, in such a way that for each subcommand c', Q is true and c' preserves I. The exact right-hand side in Nuprl of the definition of $R_{I,Q}(c)$ (denoted rcom[I, Q] in Nuprl) is the following:

(c=[I] skip
$\lor(\exists x:id.\exists e:zexp.rexp[I]e \land |c=[I]x:=e)$
$\lor(\exists c1, c2:com. (rcom[I, Q]c1 \land rcom[I, Q]c2) \land |c=[I](c1; c2))$
$\lor(\exists b:zexp\ \exists c1, c2:com$
    (rexp[I]b $\land$ rcom[I, Q]c1 $\land$ rcom[I, Q]c2)
    $\land |c=[I]$ (if b then c1 else c2))
$\lor(\exists b:zexp.\exists c':com.$ (rexp[I]b$\land$rcom[I, Q]c')$\land |c=[I]b \rightarrow c')$
$\lor(\exists p:PId\ \exists d:zexp\ \exists M:Z.\exists as:zexp\ List.$
    (rexp[I]d $\land \forall$(rexp[I]; as))$\land |c=[I]d!M(as))$
$\lor(\exists p:PId.\ \exists c':com.\ \exists M:Z.\exists as:id\ List.$
    rcom[I, Q]c'$\land |c=[I]p?M(as) \rightarrow c'))$
$\land |(Q\ c \land (\forall s:state.\ I\ s \Rightarrow I(c\ s)))$ The occurrence of $\forall$ applied to two arguments has the meaning that the property (the first argument) holds of every element of the list (the second argument). The operator $\land |$ is an alternate definition of conjunction in Nuprl which roughly makes the right hand side computationally insignificant, so that an extracted program producing a witness for the conjunction will only produce witnessing information for the left hand side. This kind of operator is defined in terms of Nuprl set type as described in R. L. Constable et al., "Implementing Mathematics with the Nuprl Proof Development System," Prentice-Hall, Englewood Cliffs, N.J., 1986. Using such alternate definitions can dramatically improve the computational efficiency of extracted programs.

For representability of programs, in addition to commands, we must represent the initial condition predicate. According to this embodiment of the invention, we choose to represent it as a command that only sets variable values. The initial states are those that result from running this command on a state with an empty history. We overload R again and use $R_{I,Q}(P)$ and $R[I,Q](P))$ to denote representability of programs. A program is representable if the initial state command is representable and each of the actions are representable.

IV. Main Results of the Nuprl Formalization

In this section, we discuss the culminating theorems of our formal proof development in Nuprl and illustrate how the program we extract from the formal proofs computes a data-abstracted version of a concrete program as long as the concrete program satisfies the condition that the control flow is independent of the data-values. We first give some additional definitions.

Instead of stating control/data independence explicitly as a requirement on programs, we will prove the theorems in such a way that the extracted program is a partial function that will succeed if the condition is satisfied and will fail otherwise. To do so, we define a "possibility" operator on propositions, denoted as ?. In particular, the formula ?A is defined to be A$\lor$ True. Clearly, for any A, this theorem holds because the right disjunct is provable. For our purposes, A will be a property such that it is provable when the independence condition holds, and not provable otherwise, and we construct the proof so that we choose to prove A whenever it is provable. Then the extracted program, given a concrete program as input, will either return a result of type A or the constant axiom which is the proof of True. When a result of type A is returned, we will know that the independence condition holds and we will be able to obtain an abstract program with the desired properties from this result.

It is to be appreciated that the "possibility" operator is a way to reason in Nuprl about representability when the expected extracted program is a partial function, i.e., one that only succeeds and returns the specified result for some of its possible inputs. On other inputs, because of the definition of the possibility operator, the function will return a special fixed value that indicates failure. This is advantageous since, for example in the abstraction algorithm generation embodiment of the invention, the abstraction algorithm embodies a test for a syntactic sufficient condition on the input protocol. If the test fails, then no useful result is returned.

In addition to extending $\phi$ to states and traces as in Section II, we also extend it to commands and programs. For commands, we have $\gamma_d^\Phi(c) = (\gamma_d^\Phi \circ c)$. Thus, applying a collapsed command is the same as applying a command to a state and then collapsing the state. For a program P≡<as, I>(as is the list of commands, I denotes the initial condition), we have:

$\gamma_d^\Phi <as, I> = <\text{map}(\gamma_d^\Phi)\ as,\ \lambda s.\exists s'.(s = \gamma_d^\Phi(s') \land I(s'))>$ where map is the usual mapping function on lists, and the first occurrence of $\gamma_d^\Phi$ on the right hand side denotes the collapsing function for commands, while the second occurrence denotes the collapsing function for states. The function $\gamma_d^\Phi$ on programs gives us a semantic notion of abstract program, which we call the "pseudo-abstract program."

There are two main theorems. The first of these is:
$\forall$drs:dref List. $\forall$phi:(idempotent).
$\forall$p:prog. $\forall$psi:{f:trace$\rightarrow$P| respects (f; $\gamma$[drs; phi])}.
   rprog p
   $\Rightarrow$($\forall$e:zexp.rexp e$\Rightarrow$rexp (phi o e))
   $\Rightarrow$?(rprog[im($\gamma$[drs;phi]),.]($\gamma$[drs;phi]p)
   $\land |$(p|=psi$\Leftrightarrow\gamma$[drs;phi]p|=psi))

This theorem states that given a list of data references, an idempotent collapsing function on integers (i.e., f is idempotent if, for all x, f(x)=f(f(x))), a representable program, and a temporal property satisfying a certain condition, then possibly the pseudo-abstract program is representable (up to states in the image of the abstraction function) and is equivalent with respect to the property psi. The hypothesis about phi is explained below. We define specialized display forms for some operators in Nuprl, so, for example, rprog [I, Q] displays as just rprog in the case that both I and Q are λx. True.

The second theorem is:

∀drs:dref List. ∀d:N. ∀p:prog.

rprog p

→(∀psi:{f:z→trace→P|perm_inv (d;drs;f)}

?(↓(∀y0:Nd. (∀y:Nd. p⊨psi y)↔p⊨psi y0)))

This theorem states that if psi is a function from integers to temporal properties satisfying a certain property, then possibly for all y0 in the set $\{0, \ldots, d-1\}$, the program satisfies psi at all y if and only if it satisfies it at y0.

Thus, to apply our abstraction method of the invention to a particular program P (which we assume has been entered into Nuprl as a member of type prog) and to a particular function Ψ from integers to temporal properties, we do the following:

(1) Prove a theorem that P is representable.
(2) Prove Ψ that satisfies the condition in the second theorem above, and that Ψ(0) satisfies the condition in the first theorem.
(3) Run the extraction of the second theorem with arguments d, some natural number d, P and the extracted program from the representability theorem. If the result is of the form inl(.), then the property under the ? holds and so it suffices to check the program satisfies Ψ(0); otherwise halt.
(4) Run the extract from the first theorem on appropriate inputs. If the result is of the form inl(x) then x will encode a representation of the abstracted program.

We have applied the methodology of the invention to an instance of the program P in the running example above. Let $P_0$ be the instance with the 3 data values $\{0, 1, 2\}$ and a queue of length 8. We choose the function $\phi_0$, take d=3, and take Ψ(y) to be G(sent=y→F(rcvd=y)). We also use the six-element set given above ({sent, <qsend, 0>, data, <rsend, 0>, rdata, rcvd}) as the set d of data references. Applying the steps (1) through (4) above succeeds, and yields the result below. We use the following abbreviation where e is any expression: F F(e):=(if e=0 then 0 else −1).

Initial Condition

λs.∃s'[(s'.2=nil)∧s=(sent:=−1; sent:=F(sent);

data:=F(data); rdata:=F(rdata); rcvd:=F(rcvd); skip)(s')]

($r_1$) true→s!request ($r_2$) buf[r]?rsend(rdata)→rcvd:=F(rdata)

($s_2$) buf[s]?request→sent:=F(2); q!qsend(F(sent), 0)

($s_1$) buf[s]?request→sent:=F(1); q!qsend(F(sent), 0)

($s_0$) buf[s]?request→sent:=F(0); q!qsend(F(sent), 0)

($q_8$) buf[q]?qsend(data, i)→ if i=8 then r!rsend (F(data)) else q!qsend(F(data), 8) fi

Because the steps succeeded, it is guaranteed that checking $\forall y \in \{0 \ldots 2\}$. Ψ(y) holds for $P_0$ is equivalent to checking that Ψ(0) holds for the above program. Note that simplifications are possible, for example, reducing or eliminating some applications of F, and collapsing the identical actions $s_1$ and $s_2$. One of ordinary skill in the art, in view of the teachings herein, would be able to implement such straightforward simplifications.

We provide a small Nuprl program below to glue together the computational parts for this example. The evaluator for Nuprl programs is a basic call-by-need interpreter. We implemented a general program optimizer before running the example program. The example terminated in about 5 seconds (on a 400 MHZ personal computer). The Nuprl program below is a closed Nuprl term whose evaluation produces the representation of the abstracted program:

let phi=phi_eg(0) in let psi=λy.psi_eg1(y) in
let p=sqr_inst1 in let p_rep=ext{sqr1_rep} in
let drs=sqr_drs1 in let phi_rep=ext{phi_eg_rep} 0 in
let d=3 in
if is1(ext{poss_data_indep} drs d p p_rep psi)
then let res=ext{abs_thm_2} drs phi p (psi 0) p_rep phi_rep in
  if is1 (res) then out1 (res) else "No" fi
else "No"
fi The expressions ext{abs_thm_2} and ext{poss_data_indep} name the respective programs extracted from the two theorems discussed above in this section. Recall that both of these programs produce a value in a disjoint union. The program above first uses poss_data_indep to test if the example program (bound to p, with representation bound to p_rep) satisfies the permutation invariance property expressed in the second theorem. If so (i.e., if the result is in the left part of the disjoint union), then it runs abs_thm_2, testing the result for success using is1. In the unsuccessful cases, "No" is returned.

It is to be appreciated that the above program may be typechecked to show that it is constructed properly and that the result satisfies the desired properties. Typechecking includes proving the appropriate conditions on psi. We just proved these separately.

The output of this program is an explicit piece of data that completely specifies the required abstract program. It is to be appreciated that to help with readability of the above Nuprl program, we implemented a conventional kind of recursive data type in the type theory for representing terms and expressions, and extracted a function that translates to this second representation. From this latter representation, we obtained by inspection, the form of the result given in this section.

V. Details of the Nuprl Proofs

Most of the work in the proof is related to proof obligations (1) and (3) of Section II above and is independent of the class of temporal properties being checked. We give details on the parts related to proof obligation (1). The work related to proof obligation (3) is similar. The work related to proof obligation (1) is divided into three main theorems. We discuss each theorem below.

(a) Sufficient Conditions on Program Commands

For proof obligation (1) of Section II above, we take P' to be the pseudo-abstract program γ(P) and show that:

∀tr.(tr∈trace(P))↔(γ(tr)∈trace(γ(P)))

In particular, we show that this holds under the assumption that the following holds for all commands c in P:(γ∘c)=(γ∘ (c∘γ)). We call this the "homomorphism property" on commands, and denote it as homγ(c). The reason that we consider this property is that it follows when the control flow of P is independent of the data references in d. Recall that the set d is the set of data references affected by the value of some variable v whose values are to be abstracted. Thus, we can proceed in two steps, showing that: (i) whenever the control flow of P is independent of the data references in d, it follows that homγ(c) holds for every command c in P; and (ii) whenever homγ(c) holds on every command c in P, it follows that proof obligation (1) holds. Then we would have a proof that the sufficient condition given for proof obligation (1) in Section II above actually is a sufficient condition.

Theorem 2 below includes a proof of (ii), but instead of (i), we prove Theorem 1 below. As a minor point, note that this theorem as well as the subsequent theorems for correctness and representability of the abstraction, only consider those abstraction functions $\phi$, which are idempotent. This requirement is necessary to show that certain commands satisfy the homomorphism property. Clearly, if is $\phi$ is idempotent, then all of our collapsing functions $\gamma_d^\Phi$ are also idempotent.

Theorem 1 (Sufficient Conditions for Program Commands). Let d be a set of data references and let $\phi$ be an idempotent function on integers. Let P be a program such that R[True, True](P) holds. Then ?R[True, hom$\gamma_d^\Phi$](P) holds.

We prove this theorem by induction on representability, considering a case ?R[True, hom$\gamma$](c) for each type of command c, and then proving the property R[True, hom$\gamma$](c) for the commands where it can be seen to hold according to our sufficient condition. If we were using an explicit approach to syntax, this inductive argument would correspond to a proof by induction over syntax trees that (possibly) the homomorphism property holds of the meaning of a tree and all of its subtrees.

Several of the commands involve the evaluation of an expression e and require that (e=(eo$\gamma$)). Checking this property uses a lemma, involving the possibility operator, which incorporates a sufficient condition on expressions that can be explained using the following recursive predicate (which is not formalized in Nuprl):

independent $(e,d):=(e=$true$)\lor(e=$false$)\lor(\exists n:Z.e=n)\lor$
$(\exists y:id.e=y \land y \notin d)\lor[((e=(e_1+e_2))\lor(e=(e_1-e_2))\lor(e=(e_1=e_2))\lor$ $(e=(e_1 \land e_2))\lor(e=(e_1 \lor e_2)))\land($independent $(e_1, d)\land$ independent $(e_2, d))]\lor$ $[(e=\neg e_1)\land$ independent $(e_1, d)]\lor[(e=($if $b$ then $e_1$ lse $e_2))\land($independent $(b,d)\land($independent $(e_1, d)\land$ independent $(e_2, d))]$ For commands, R[True, hom$\gamma_d^\Phi$](c) holds provided c itself as well as all of its subcommands are of one of the following forms. This corresponds to a syntactic check of whether the control flow of a program P is independent of the data references in d when c is a command in P.
(1) c has the form x:=e:

$[x \in d \land(e=$true $\lor e=$false$\lor(\exists n:Z.e=n)\lor(\exists y:id.e=y))]\lor[x \notin d \land$ independent$(e,d)]$ (2) c has the form if b then $c_1$ else $c_2$: independent(b,d)
(3) c has the form b→c: independent(b,d)
(4) c has the form p→d!T(args). Let n be the length of args.

$\notin i:\{0, \ldots, n-1\}.[(<T,i> \in d \land(\exists n:Z.args[i]=n)\lor(\exists y:id.args[i]=y)))\lor(<T,i> \notin d \land($independent$(args[i], d)))]\land$independent$(d,d)$ (5) c has the form p?T(ids)→c. Let n be the length of ids.

$\forall I:\{0, \ldots, n-1\}.[<T,i> \in d \leftrightarrow ids[i] \in d]$ (b) Soundness of Abstraction Let $\psi$ be a predicate of traces. We define the predicate respects such that respects($\psi$, F) holds whenever ⋈tr.$\psi$(tr)↔$\psi$(F(tr)) holds. In particular, the function F that we are interested in will be $\gamma$. The formal statement of correctness of our abstraction mechanism is outlined in the following theorem.

Theorem 2 (Correctness of Abstraction). Let d be a set of data references and let $\phi$ be an idempotent function on integers. Let P be a program such that R[True, hom$\gamma_d^\Phi$](P) holds, and let $\psi$ be an LTL formula such that respects($\psi,\gamma_d^\Phi$). Then P$\models\psi \leftrightarrow \gamma_d^\Phi(P)\models\psi$.

In addition to proving that property (1) in Section V(a) above holds from the assumption that hom$\gamma$(c) holds on every command in P, this theorem also proves a version of proof obligation (2) mentioned in Section II above. Recall that P$\models\psi$ denotes the fact that all valid traces of P satisfy $\psi$.

(c) Representability of Abstraction

To obtain a program that computes abstracted specifications, we must show that $\gamma_d^\Phi(P)$ in Theorem 2 is representable. In particular, it must be shown that its initial condition can be expressed as a property on states, and that each of the commands ($\gamma$oc) of $\gamma$(P) can be represented as a command in the guarded command language. The program representing $\gamma_d^\Phi(P)$ need only be equivalent to $\gamma_d^\Phi(P)$ on collapsed states, that is, states in the image of the function $\gamma$. We express this notion formally via a predicate on states, denoted im$\gamma$, defined by im$\gamma$(s) if and only if $\exists$s':state.s=$\gamma$(s'). We give some sample cases of the proof of representability of such pseudo-abstract programs to illustrate that the reasoning is semantic. For this theorem, we need the additional condition on $\phi$ that for any expression that is representable, (($\phi$oe) is also representable. This condition is important for the representability of assignment statements. Some of the reasoning involves the following equalities which we prove and use as rewrites in Nuprl.

$x \in d \Rightarrow x.(\gamma_d^\varphi(s)) = \varphi(x.s) \quad x.((x := e)(s)) = e.s$ $x \notin d \Rightarrow x.(\gamma_d^\varphi(s)) = x.s \quad x \neq y \Rightarrow y.((x := e)(s)) = y.s$ Theorem 3 (Representability of Abstract Program). Let d be a set of data references. Let $\phi$ be an idempotent function on integers that has the property that for any expression e, if R[True,True](e) holds, then R[True,True]($\phi$oe) also holds. Let P be a program such that R[True, hom$\gamma_d^\Phi$](P) holds. Then R[im$\gamma_d^\Phi$, True]($\gamma_d^\Phi(P)$) holds.

Proof. From R[True, hom$\gamma$](P) we know that program P is representable and each of its commands c and its subcommands satisfy the property ($\gamma$oc)=($\gamma$o(co$\gamma$)). The main obligation is to show that each action in $\gamma$(P) is representable up to im$\gamma$. Commands in $\gamma$(P) have the form ($\gamma$oc) where c is in P. Thus, we have to show that there is a command c' that represents ($\gamma$oc) and is equivalent to it when applied to states in the image of $\gamma$. The proof is by case analysis on the different forms that c can take. We show the assignment and send cases to illustrate.

If the command c is x:=e, first suppose that x is in d. We show that ($\gamma$o(x:=e)) is representable by x:=($\phi$oe). We know that ($\phi$oe) is representable by assumption. We must show that ($\gamma$o(x:=e))(s) is the same state as (x:=(($\phi$oe))(s); or equivalently that ($\gamma$o(x:=e))($\gamma$(s')) is the same state as (x:=($\phi$oe))($\gamma$(s')) where $\gamma$(s')=s; or by unfolding composition, that ($\gamma$o(x:=e))($\gamma$(s')) is the same state as (x:=($\phi$oe))($\gamma$(s')). We need to consider evaluating an arbitrary variable y in these two states and show that the same value is obtained in either case. If y is x, both expressions evaluate to the same value as follows:

$x.(\gamma((x:=e)(\gamma(s'))))=\phi(x.((x:=e)(\gamma(s'))))=\phi(e.(\gamma(s')))\ x(x:=(\phi oe))(\gamma(s'))=((\phi oe))(\gamma(s'))=\phi(e.(\gamma(s')))$ If y is different from x and y is in d, we have:

$y.(\gamma((x:=e)(\gamma(s'))))=\phi(y.((x:=e)(\gamma(s'))))=\phi(y.(\gamma(s')))=\phi(\phi(y.s'))\ y.(x:=(\phi oe))(\gamma(s'))=y.(\gamma(s'))=\phi(y.s')$ where $\phi(\phi(y.s'))=\phi(y.s')$ by the idempotence of $\phi$. If y is different from x and y is not in d, both expressions evaluate to y.s'. If x is not in d, we show that ($\gamma$o(x:=e)) is representable simply by x:=e using similar reasoning.

If the command c is (p→d!T(es)), we represent (γo (p→d!T(es))) by p→d!T(es'), where for each position i in es, if es[i] is e, then es'[i] is the expression: λs.if<T,i>∈d then (φoe).s else e.s. We have the additional obligation to show that these new expressions are representable. This follows if we can show that both the expressions ((φoe).s and e.s in the then and else clauses are both representable. These follow from the assumption that the original command is representable and the assumption on ((φoe). We must also show that for s in the image of γ, (γo(p→d!T(es)))(s) is the same state as (p→d!T(es'))(s). We need to show that the single new element added to the history by each of these two commands is the same. This requires showing the equivalence of the two lists of message arguments, which follows directly from the definition of es'[i] given above.

Figure 2:
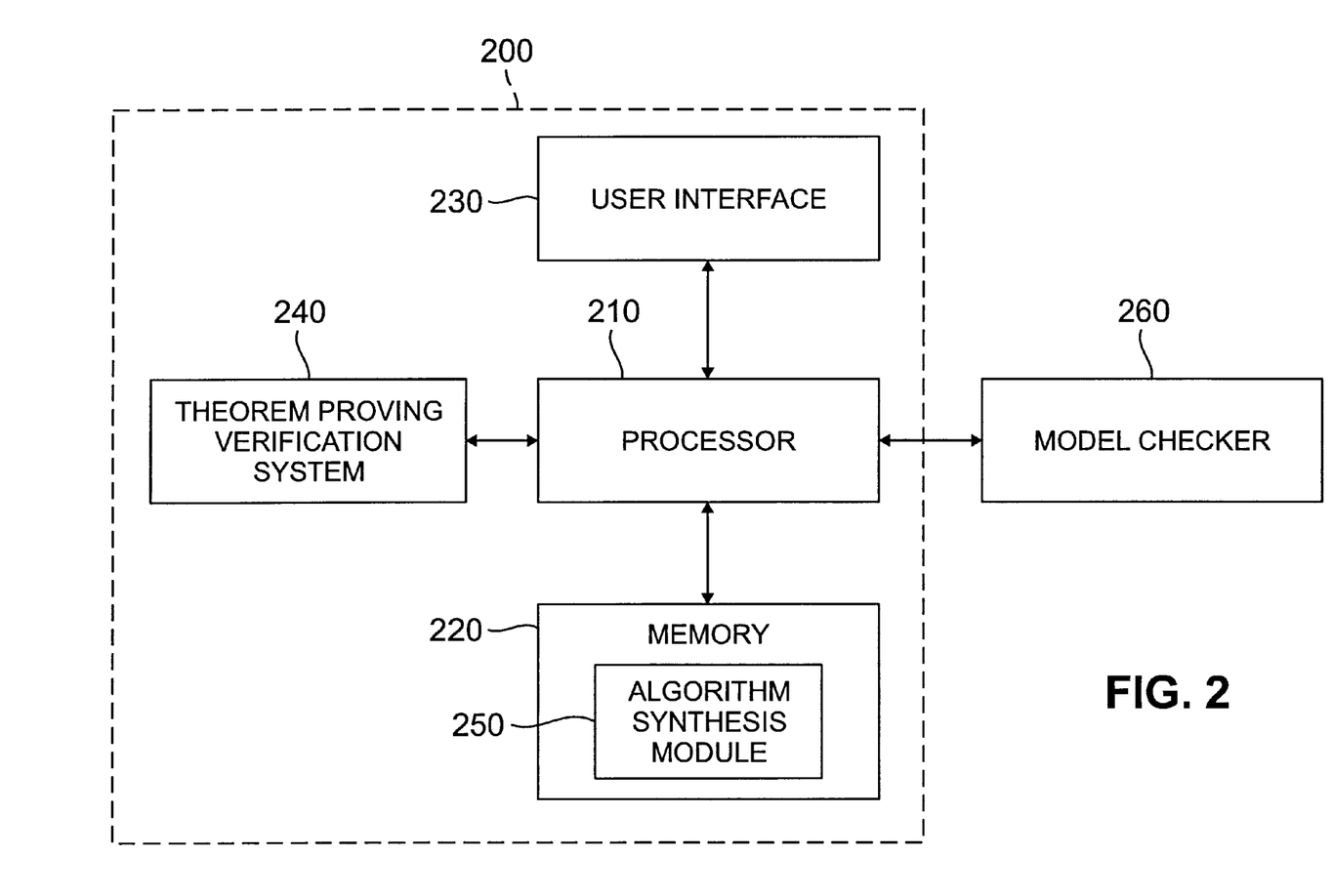
FIG. 2 is a block diagram illustrating an embodiment of an abstraction algorithm synthesis apparatus in accordance with the present invention.

Referring now to FIG. 2, a block diagram illustrating an embodiment of an abstraction algorithm synthesis apparatus in accordance with the present invention is shown. The abstraction algorithm synthesis apparatus 200 includes a processor 210 coupled to a memory 220, a user interface 230, and a theorem proving verification system 240, e.g., a Nuprl environment. Processor 210 is operable to direct, and work in conjunction with, verification system 240 and algorithm synthesis module 250 to synthesize a verified abstraction algorithm capable of abstracting an input program to form an abstracted version thereof. It is to be appreciated that algorithm synthesis module 250, resident in memory 220, in conjunction with the verification system 240 and under operative control of processor 210 performs the steps described herein for generating a verified abstraction algorithm according to the invention. A user may interface with the verification system 240 and the algorithm synthesis module 250 through the user interface 230. The user interface may include input devices, e.g., keyboard, and output devices, e.g., graphical display monitor, associated with a computer system supporting the apparatus. Once a verified abstraction algorithm is generated, an abstracted protocol may be generated therefrom and the processor 210 may direct a model checker 260 to check the abstracted protocol with respect the performance criteria associated with underlying subject system.

Figure 3:
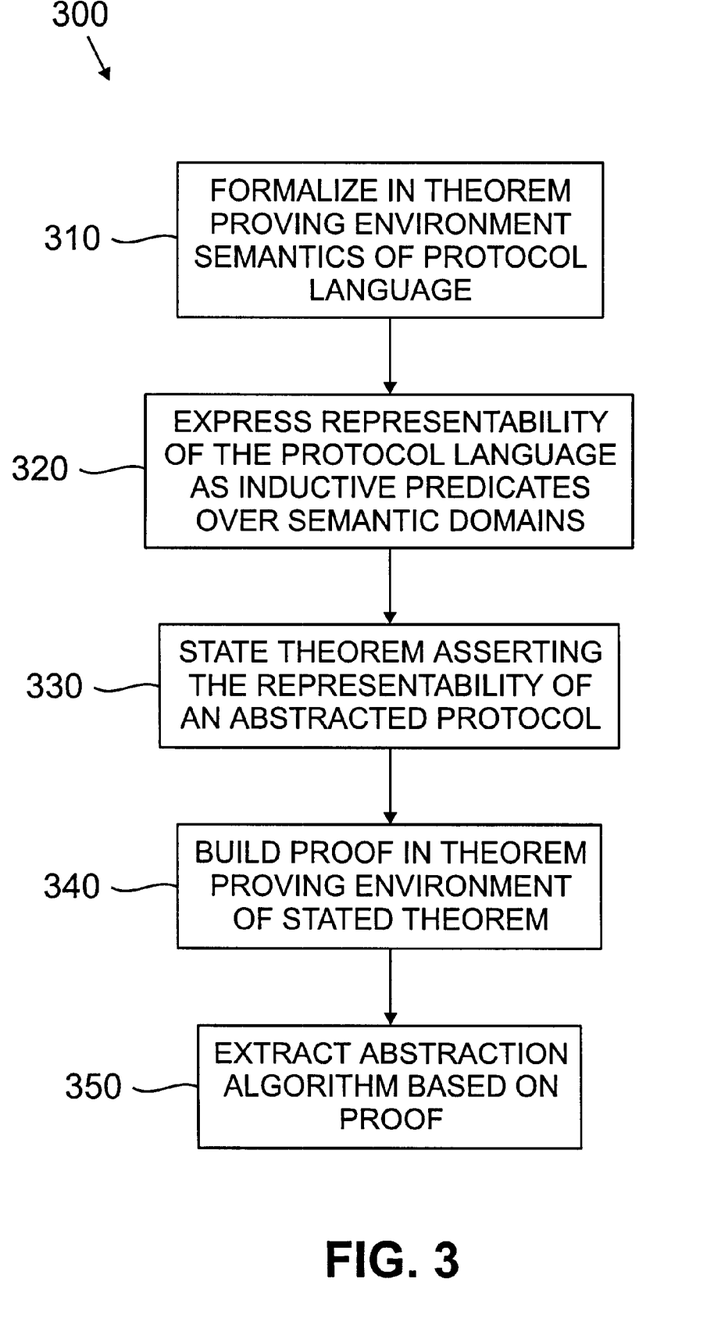
FIG. 3 is a flow chart illustrating an embodiment of an abstraction algorithm synthesis method in accordance with the present invention.

Referring now to FIG. 3, a flow chart illustrating an embodiment of an abstraction algorithm synthesis method 300 in accordance with the present invention is shown. It is to be appreciated that the following description is intended to represent a general description of steps of the abstraction algorithm synthesis methodology described above in the context of the running example using Program P.

In step 310, the programming language that the protocol to be abstracted is written in is formalized in the theorem proving environment, in this embodiment, Nuprl (e.g., Section I above). Step 320 provides for expressing the representabilty of the protocol language as inductive predicates over semantic domains (e.g., Section III above). Next, in step 330, a theorem is stated asserting the representability of an abstracted protocol (e.g., Section IV above). This is based on the fact that the original protocol that is to be abstracted is known to the theorem prover, e.g., by being previously input thereto. Then, in step 340, a proof is built in the theorem prover of the stated theorem (e.g., Section V above). Lastly, in step 350, the verified-correct abstraction algorithm may be extracted from the theorem prover protocol (e.g., Section IV above). As shown in FIG. 1, the original protocol and its correctness property can be submitted to the verified abstraction algorithm which, in response, generates the abstracted protocol and property. Advantageously, the abstracted protocol and property can be input to a model checker in order to check that the protocol sufficiently models the performance specifications of the underlying actual system being simulated.

Accordingly, using the example of data-value abstraction, we have verified the correctness of an abstraction method for specifications satisfying a particular sufficient condition on their syntax. We have exploited the constructivity of Nuprl to extract a program which can compute the abstract specification corresponding to any concrete specification satisfying the sufficient condition. Advantageously, we were able to do so using only semantic reasoning.

It is to be appreciated that the methodology of the invention using syntax implicitly can easily coexist with the explicit approach. For example, we could define a conventional recursive type of abstract syntax trees, write a meaning function, and prove that for every representable program there is a tree whose meaning is the program. Further, it is to be appreciated that with respect to non-deterministic commands, we can include a command that non-deterministically chooses one from an indexed set of commands. Still further, the present invention can be extended to deal with temporal properties in the same way as programs. One difficulty is dealing with binding expressions such as universal quantification. One approach to deal with universal quantification is to use a program variable in place of the quantified variable. This approach is also extendable to data-path abstraction, for example, collapsing the queue in our example.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of synthesizing an algorithm for transforming a program from a first form to a second form, the method comprising the steps of:

formalizing a language associated with the program to be transformed in accordance with a theorem proving system;

building a proof in accordance with the theorem proving system based on a theorem asserting a representability associated with the program, the representability being expressed as inductive predicates over semantic domains; and extracting the algorithm based on the proof such that the algorithm is capable of transforming the program from the first form to the second form.

2. The method of claim 1, wherein the synthesized algorithm is an abstraction algorithm such that the first form of the program is concrete and the second form of the program is abstracted.

3. The method of claim 2, wherein the synthesized abstraction algorithm is correctness verified with respect to the program applied thereto for transformation.

4. The method of claim 1, wherein the proof reasons on semantics associated with the program language while the extracted algorithm is capable of operating on syntax associated with the program language.

5. The method of claim 1, wherein the theorem proving system is Nuprl.

6. The method of claim 1, wherein the building step implements a possibility operator which expresses representability when the extracted algorithm is a partial function.

7. The method of claim 1, wherein representability is parameterized.

8. The method of claim 1, wherein representability implements one or more variants of standard logic connectives.

9. Apparatus for synthesizing an algorithm for transforming a program from a first form to a second form, the apparatus comprising:

at least one processor operative to formalize a language associated with the program to be transformed in accordance with a theorem proving system, to build a proof in accordance with the theorem proving system based on a theorem asserting a representability associated with the program, the representability being expressed as inductive predicates over semantic domains, and to extract the algorithm based on the proof such that the algorithm is capable of transforming the program from the first form to the second form; and memory, coupled to the at least one processor, for storing at least a portion of results associated with formalizing, building, and extracting operations.

10. The apparatus of claim 9, wherein the synthesized algorithm is an abstraction algorithm such that the first form of the program is concrete and the second form of the program is abstracted.

11. The apparatus of claim 10, wherein the synthesized abstraction algorithm is correctness verified with respect to the program applied thereto for transformation.

12. The apparatus of claim 9, wherein the proof reasons on semantics associated with the program language while the extracted algorithm is capable of operating on syntax associated with the program language.

13. The apparatus of claim 9, wherein the theorem proving system is Nuprl.

14. The apparatus of claim 9, wherein the building operation implements a possibility operator which expresses representability when the extracted algorithm is a partial function.

15. The apparatus of claim 9, wherein representability is parameterized.

16. The apparatus of claim 9, wherein representability implements one or more variants of standard logic connectives.

17. An article of manufacture for synthesizing an algorithm for transforming a protocol from a first form to a second form, comprising a machine readable medium containing one or more programs which when executed implement the steps of:

formalizing a language associated with the program to be transformed in accordance with a theorem proving system;

building a proof in accordance with the theorem proving system based on a theorem asserting a representability associated with the program, the representability being expressed as inductive predicates over semantic domains; and extracting the algorithm based on the proof such that the algorithm is capable of transforming the program from the first form to the second form.

* * * * *